(12) United States Patent
Tanaka

(10) Patent No.: US 6,597,657 B1
(45) Date of Patent: Jul. 22, 2003

(54) UNIT AND METHOD FOR DUPLEX CALL CONTROL FOR SVC CONNECTION

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,338

(22) Filed: Jan. 6, 2000

(30) Foreign Application Priority Data

Jan. 8, 1999 (JP) .......................................... 11-003149

(51) Int. Cl.[7] .............................................. G01R 31/08
(52) U.S. Cl. ...................................... 370/219; 370/250
(58) Field of Search ................................ 370/216–228, 370/242, 244, 248, 249, 250, 254, 252, 395.1, 395.2, 395.21, 395.3, 395.31

(56) References Cited

U.S. PATENT DOCUMENTS

| | | | | |
|---|---|---|---|---|
| 6,049,542 A | * | 4/2000 | Prasad | 370/386 |
| 6,072,610 A | * | 6/2000 | Kuroyanagi et al. | 359/117 |
| 6,215,765 B1 | * | 4/2001 | McAllister et al. | 370/217 |
| 6,411,599 B1 | * | 6/2002 | Blanc et al. | 370/219 |
| 6,442,131 B1 | * | 8/2002 | Kondo | 370/218 |
| 6,463,062 B1 | * | 10/2002 | Buyukkoc et al. | 370/395.1 |

FOREIGN PATENT DOCUMENTS

| | | |
|---|---|---|
| JP | 2-272938 | 11/1990 |
| JP | 9-261698 | 10/1997 |
| JP | 10-13433 | 1/1998 |
| JP | 10-84354 | 3/1998 |
| JP | 10-98524 | 4/1998 |
| JP | 2000-69019 | 3/2000 |

* cited by examiner

*Primary Examiner*—David Vincent
(74) *Attorney, Agent, or Firm*—Sughrue Mion, PLLC

(57) ABSTRACT

In a duplex call control unit for SVC connection, call control parameters with respect to SVC connection information with regard to SVC connection which has already been established and call control parameters with respect to the statuses of call control protocols for SVC connection which is being established or being released are stored in a call control parameter database section. The parameters are referred to by a first call control section or a second call control section that is operating as a standby system call control section or that is restarting working, and thereby call control parameters of the call control section is adjusted. A control section monitors two ATM switch sections and the two call control sections and outputs instructions concerning bus connection of a first switch-over section between ATM lines and the ATM switch sections and bus connection of a second switch-over section between the ATM switch sections and the call control sections so that the operations of the ATM switch section can be executed at least by one of the ATM switch sections that is working and so that the operations of the call control section can be executed at least by one of the call control sections that is working. By such operations, a call during SVC connection establishment/release can be saved from being interrupted on a switch-over from the "operating system" to the "standby system".

23 Claims, 9 Drawing Sheets

UNIT AND METHOD FOR DUPLEX CALL CONTROL FOR SVC CONNECTION

BACKGROUND OF THE INVENTION

The present invention relates to a unit and a method for duplex call control for SVC (Switched Virtual Channel) connection, which is implemented as an ATM switch, an ATM subscriber line concentrator, etc. having duplex composition composed of an operating (working) system and a standby (protection) system.

Description of the Prior Art

In ATM (Asynchronous Transfer Mode) networks, three protocols are used as control protocols for establishing/releasing SVC (Switched Virtual Channel) connection. The first is a protocol according to ITU-T Q.2110 (hereafter, referred to as "SSCOP (Service Specific Connection Oriented Protocol)"). The second is a protocol according to ITU-T Q.2130 (hereafter, referred to as "SSCF (Service Specific Coordination Function)"). The third is a protocol for the signaling layer, according to ITU-T Q.2931, ITU-T Q.2971, ATM Forum Technical Committee UNI (User-Network Interface) Specification Version 3.1 (hereafter, referred to as "UNI3.1"), or ATM Forum Technical Committee ATM UNI Signaling Specification Version 4.0 (hereafter, referred to as "UNI4.0"). Each of the four standard specifications (ITU-T Q.2931, ITU-T Q.2971, UNI3.1, UNI4.0) for the signaling layer is hereafter referred to as "UNI signaling".

FIG. 1 is a block diagram showing an example of the composition of a conventional duplex call control unit. The conventional duplex call control unit shown in FIG. 1 is composed of an operating (working) system (including an ATM switch section 100a and a call control section 101a), a standby (protection) system (including an ATM switch section 100b and a call control section 101b), and line interface sections 102a, 102b, . . . , 102n. The operating system ATM switch section 100a and the standby system ATM switch section 100b are connected to the line interface sections 102a, 102b, . . . , 102n via buses 151a, 151b, 150, 154a, 154b, . . . , 154n. The standby system ATM switch section 100b can not receive ATM cells from the line interface sections 102a, 102b, . . . , 102n via the buses 151b, 150, 154a, 154b, . . . , 154n until a switch-over from the operating system ATM switch section 100a occurs. The operating system ATM switch section 100a is connected to the operating system call control section 101a via a bus 152a, and the standby system ATM switch section 100b is connected to the standby system call control section 101b via a bus 152b. The operating system call control section 101a and the standby system call control section 101b are connected together via a bus 153. The line interface sections 102a, 102b, . . . , 102n transmit and receive ATM cells to/from ATM networks or subscriber terminals via ATM lines 155a, 155b, . . . , 155n, respectively.

The operating system ATM switch section 100a receives ATM cells via the bus 151a, extracts call control cells for SVC connection (VPI=0, VCI=5) from the ATM cells, and sends the extracted call control cells to the operating system call control section 101a via the bus 152a. The operating system call control section 101a which received the call control cells executes call control according to the call control cells. In the call control, the operating system call control section 101a communicates UNI signaling messages of the signaling layer by use of the call control cells. The operating system call control section 101a first receives a UNI signaling message "SETUP" and transmits the UNI signaling message "SETUP" to the destination of the SVC connection. When a UNI signaling message "CONNECT" from the destination arrived, the operating system call control section 101a sets SVC connection information (as the result of the call control) to the operating system ATM switch section 100a, and thereby establishes the SVC connection. The operating system call control section 101a sends the SVC connection information of the established SVC connection only, to the standby system call control section 101b via the bus 153. The standby system call control section 101b which received the SVC connection information sets the same SVC connection information to the standby system ATM switch section 100b and thereby establishes the same SVC connection (as the SVC connection which has been set to the operating system ATM switch section 100a) to the standby system ATM switch section 100b. When failure or maintenance occurred to the operating system ATM switch section 100a or the operating system call control section 101a, the bus 151a for connecting the operating system ATM switch section 100a and the bus 150 is disabled and the bus 151b for connecting the standby system ATM switch section 100b and the bus 150 is enabled, thereby the reception and transmission of ATM cells are thereafter executed by the standby system ATM switch section 100b. Thereafter, the standby system call control section 101b executes the call control.

However, in the conventional duplex call control unit which has been explained above, SSCOP link connections are necessitated to be disconnected when the switch-over from the operating system to the standby system is executed. Information concerning the SSCOP layer which is being operated is not communicated between the operating system call control section 101a and the standby system call control section 101b, therefore, mismatch of the SSCOP layer status occurs between the operating system call control section 101a and the standby system call control section 101b. Therefore, the SSCOP layer status of the standby system call control section 101b on the switch-over becomes different from peer protocol, that is, mismatch of the SSCOP layer status occurs between the standby system call control section 101b and an adjacent ATM switch or a subscriber terminal which has been linked with the operating system call control section 101a, and thus the SSCOP link connections are necessitated to be disconnected on the switch-over.

Due to the disconnection of the SSCOP link connections, some of signaling messages which should be communicated via the SSCOP link connections are missed or lost, and thereby a call during establishment/release of the SVC connection is necessitated to be interrupted.

SUMMARY OF THE INVENTION

It is therefore the primary object of the present invention to provide a duplex call control unit and a duplex call control method for SVC connection by which the disconnection of the SSCOP link connections on the switch-over from the operating system to the standby system is eliminated, information concerning established SVC connection can be held on the switch-over, and call control for a call during SVC connection establishment/release can also be continued and executed normally on the switch-over.

In accordance with a first aspect of the present invention, there is provided a duplex call control unit comprising a first ATM switch section, a second ATM switch section, a first call control section, a second call control section, a call control parameter database section, a control section, a first switch-over section and a second switch-over section. The first ATM switch section for switching ATM cells extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines. The second ATM switch section also executes the above operations of the ATM switch section similarly to the first ATM switch section. The first call control section receives call control cells which has been extracted by the first ATM switch section or the second ATM switch section, outputs call control cells as response to the first ATM switch section or the second ATM switch section, and when call control for an SVC connection is completed, sets SVC connection information to the first ATM switch section or the second ATM switch section. The second call control section also executes the above operations of the call control section similarly to the first call control section. The call control parameter database section stores call control parameters with respect to SVC connection information with regard to SVC connection which has already been established and call control parameters with respect to the statuses of call control protocols for SVC connection which is being established or being released. The call control parameters stored in the call control parameter database section are referred to by the first call control section or the second call control section that is operating as a standby system call control section or that is restarting working, for adjusting its call control parameters. The control section monitors operating statuses of the first ATM switch section, the second ATM switch section, the first call control section and the second call control section, and outputs instructions concerning bus connection depending on the monitored operating statuses. The first switch-over section switches bus connection between the ATM lines and the ATM switch sections according to the instructions supplied from the control section so that the aforementioned operations of the ATM switch section can be executed at least by the first ATM switch section or the second ATM switch section that is working. The second switch-over section switches bus connection between the ATM switch sections and the call control sections according to the instructions supplied from the control section so that the aforementioned operations of the call control section can be executed at least by the first call control section or the second call control section that is working.

In accordance with a second aspect of the present invention, in the first aspect, the call control parameters with respect to SVC connection information include "VPI (Virtual Path Identifier)", "VCI (Virtual Channel Identifier)", "traffic information", "band width", and "call reference".

In accordance with a third aspect of the present invention, in the second aspect, the call control parameter "traffic information" includes "priority" and "QoS (Quality of Service)".

In accordance with a fourth aspect of the present invention, in the first aspect, the call control parameters with respect to call control protocol statuses include call control parameters for the SSCOP layer, SSCF layer and call control parameters for the signaling layer.

In accordance with a fifth aspect of the present invention, in the fourth aspect, the call control parameters for the SSCOP layer include "SSCOP state variables", "SSCOP timer value", "SSCOP parameters", "maximum SSCOP SDU size", and "maximum SSCOP UU size(j)" for each SSCOP link connections.

In accordance with a sixth aspect of the present invention, in the fourth aspect, the call control parameters for the SSCF layer include "SSCF state variables" for each SSCOP link connections.

In accordance with a seventh aspect of the present invention, in the fourth aspect, the call control parameters for the signaling layer include "call reference" and "status for call reference" for each calls.

In accordance with an eighth aspect of the present invention, in the first aspect, in the case where the control section detected that all of the four monitored components are working, the control section instructs the first switch-over section to execute bus connection for transferring the ATM cells supplied via the ATM lines to both the first ATM switch section and the second ATM switch section and transmitting ATM cells supplied from the first ATM switch section to the ATM lines, and instructs the second switch-over section to execute bus connection for transferring the call control cells extracted by the first ATM switch section to both the first call control section and the second call control section, transferring the call control cells as response outputted by the first call control section to the first ATM switch section, transferring SVC connection information outputted by the first call control section as the result of the call control to the first ATM switch section, and transferring SVC connection information outputted by the second call control section as the result of the call control to the second ATM switch section. In the case where the control section detected that the first call control section out of the four monitored components is not working, the control section instructs the first switch-over section to execute bus connection for transferring the ATM cells supplied via the ATM lines to both the first ATM switch section and the second ATM switch section and transmitting ATM cells supplied from the first ATM switch section to the ATM lines, and instructs the second switch-over section to execute bus connection for transferring the call control cells extracted by the first ATM switch section to the second call control section, transferring the call control cells as response outputted by the second call control section to the first ATM switch section, and transferring SVC connection information outputted by the second call control section as the result of the call control to both the first ATM switch section and the second ATM switch section. In the case where the control section detected that the first ATM switch section out of the four monitored components is not working, the control section instructs the first switch-over section to execute bus connection for transferring the ATM cells supplied via the ATM lines to the second ATM switch section and transmitting ATM cells supplied from the second ATM switch section to the ATM lines, and instructs the second switch-over section to execute bus connection for transferring the call control cells extracted by the second ATM switch section to both the first call control section and the second call control section, transferring the call control cells as response outputted by the second call control section to the second ATM switch section, and transferring SVC connection information outputted by the second call control section as the result of the call control to the second ATM switch section. In the case where the control section detected that the first call control section and the first ATM switch section out of the four monitored components are not working, the control section instructs the first switch-over section to execute bus connection for transferring the ATM cells supplied via the ATM lines to the second ATM switch section and transmitting ATM cells supplied from the second ATM switch section to the ATM lines, and instructs the second switch-over section to execute bus connection for transferring the call control cells extracted by the second ATM switch section to the second call control section, transferring the call control cells as response outputted by the second call control section to the second ATM switch section, and transferring SVC connection information outputted by the second call control section as the result of the call control to the second ATM switch section.

In accordance with a ninth aspect of the present invention, there is provided a duplex call control method for controlling a duplex call control unit which is provided with a first ATM switch section, a second ATM switch section, a first call control section and a second call control section. The first ATM switch section for switching ATM cells extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines. The second ATM switch section also executes the above operations of the ATM switch section similarly to the first ATM switch section. The first call control section receives call control cells which has been extracted by the first ATM switch section or the second ATM switch section, outputs call control cells as response to the first ATM switch section or the second ATM switch section, and when call control for an SVC connection is completed, sets SVC connection information to the first ATM switch section or the second ATM switch section. The second call control section also executes the above operations of the call control section similarly to the first call control section. The duplex call control method comprises a call control parameter storage step, a call control parameter reference step and a bus connection control step. In the call control parameter storage step, call control parameters with respect to SVC connection information with regard to SVC connection which has already been established and call control parameters with respect to the statuses of call control protocols for SVC connection which is being established or being released are stored in a call control parameter database section to be referred to by the first call control section or the second call control section for adjusting its call control parameters. In the call control parameter reference step, the call control parameters stored in the call control parameter database section is referred to by the first call control section or the second call control section that is operating as a standby system call control section or that is restarting working, and thereby call control parameters of the call control section is adjusted. In the bus connection control step, operating statuses of the first ATM switch section, the second ATM switch section, the first call control section and the second call control section are monitored, and instructions concerning bus connection are generated and outputted depending on the monitored operating statuses so as to control bus connection of a first switch-over section which is provided between the ATM lines and the ATM switch sections and bus connection of a second switch-over section which is provided between the ATM switch sections and the call control sections so that the aforementioned operations of the ATM switch section can be executed at least by the first ATM switch section or the second ATM switch section that is working and so that the aforementioned operations of the call control section can be executed at least by the first call control section or the second call control section that is working.

In accordance with a tenth aspect of the present invention, in the ninth aspect, the call control parameters with respect to SVC connection information include "VPI (Virtual Path Identifier)", "VCI (Virtual Channel Identifier)", "traffic information", "band width", and "call reference".

In accordance with an eleventh aspect of the present invention, in the tenth aspect, the call control parameter "traffic information" includes "priority" and "QoS (Quality of Service)".

In accordance with an twelfth aspect of the present invention, in the ninth aspect, the call control parameters with respect to call control protocol statuses include call control parameters for the SSCOP layer, SSCF layer and call control parameters for the signaling layer.

In accordance with a thirteenth aspect of the present invention, in the twelfth aspect, the call control parameters for the SSCOP layer include "SSCOP state variables", "SSCOP timer value", "SSCOP parameters", "maximum SSCOP SDU size", and "maximum SSCOP UU size(j)" for each SSCOP link connections.

In accordance with a fourteenth aspect of the present invention, in the twelfth aspect, the call control parameters for the SSCF layer include "SSCF state variables" for each SSCOP link connections.

In accordance with a fifteenth aspect of the present invention, in the twelfth aspect, the call control parameters for the signaling layer include "call reference" and "status for call reference" for each calls.

In accordance with a sixteenth aspect of the present invention, in the bus connection control step of the ninth aspect, in the case where all of the four monitored components are detected to be working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to both the first call control section and the second call control section, transferring the call control cells as response outputted by the first call control section to the first ATM switch section, transferring SVC connection information outputted by the first call control section as the result of the call control to the first ATM switch section, and transferring SVC connection information outputted by the second call control section as the result of the call control to the second ATM switch section. In the case where the first call control section out of the four monitored components is detected to be not working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to the second call control section, transferring the call control cells as response outputted by the second call control section to the first ATM switch section, and transferring SVC connection information outputted by the second call control section as the result of the call control to both the first ATM switch section and the second ATM switch section. In the case where the first ATM switch section out of the four monitored components is detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to both the first call control section and the second call control section, transferring the call control cells as response outputted by the second call control section to the second ATM switch section, and transferring SVC connection information outputted by the second call control section as the result of the call control to the second ATM switch section. In the case where the first call control section and the first ATM switch section out of the four monitored components are detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to the second call control section, transferring the call control cells as response outputted by the second call control section to the second ATM switch section, and transferring SVC connection information outputted by the second call control section as the result of the call control to the second ATM switch section.

In accordance with seventeenth through twenty-second aspects of the present invention, there are provided machine-readable record mediums storing programs for instructing a microprocessor unit etc. to execute duplex call control processes according to the duplex call control methods of the eighth, ninth, eleventh, twelfth, thirteenth and fourteenth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
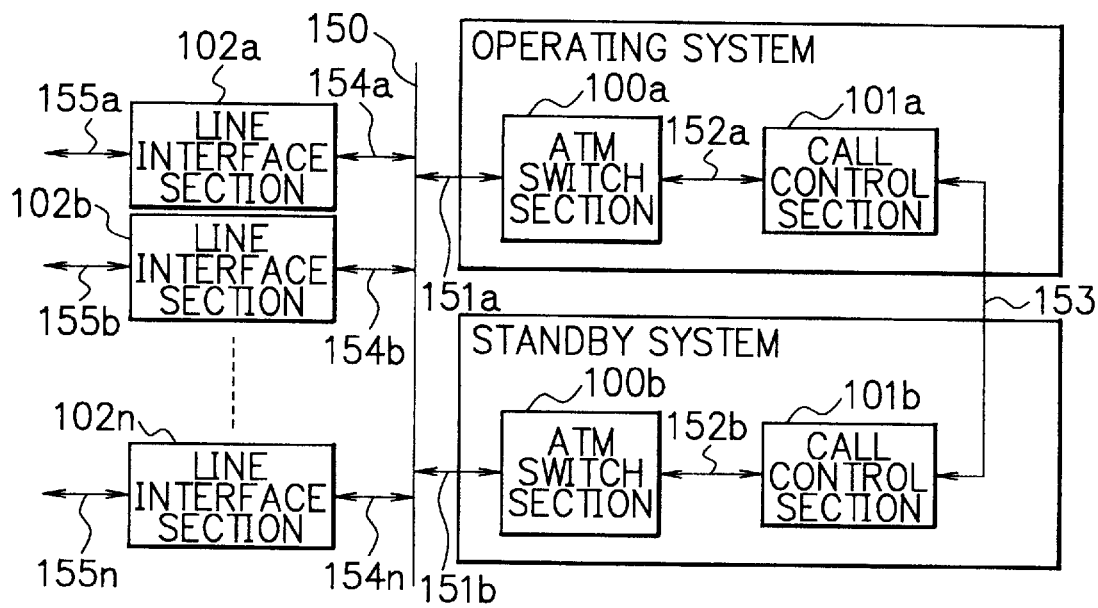
FIG. 1 is a block diagram showing an example of the composition of a conventional duplex call control unit.

Referring now to the drawings, a description will be given in detail of preferred embodiments in accordance with the present invention.

Figure 2:
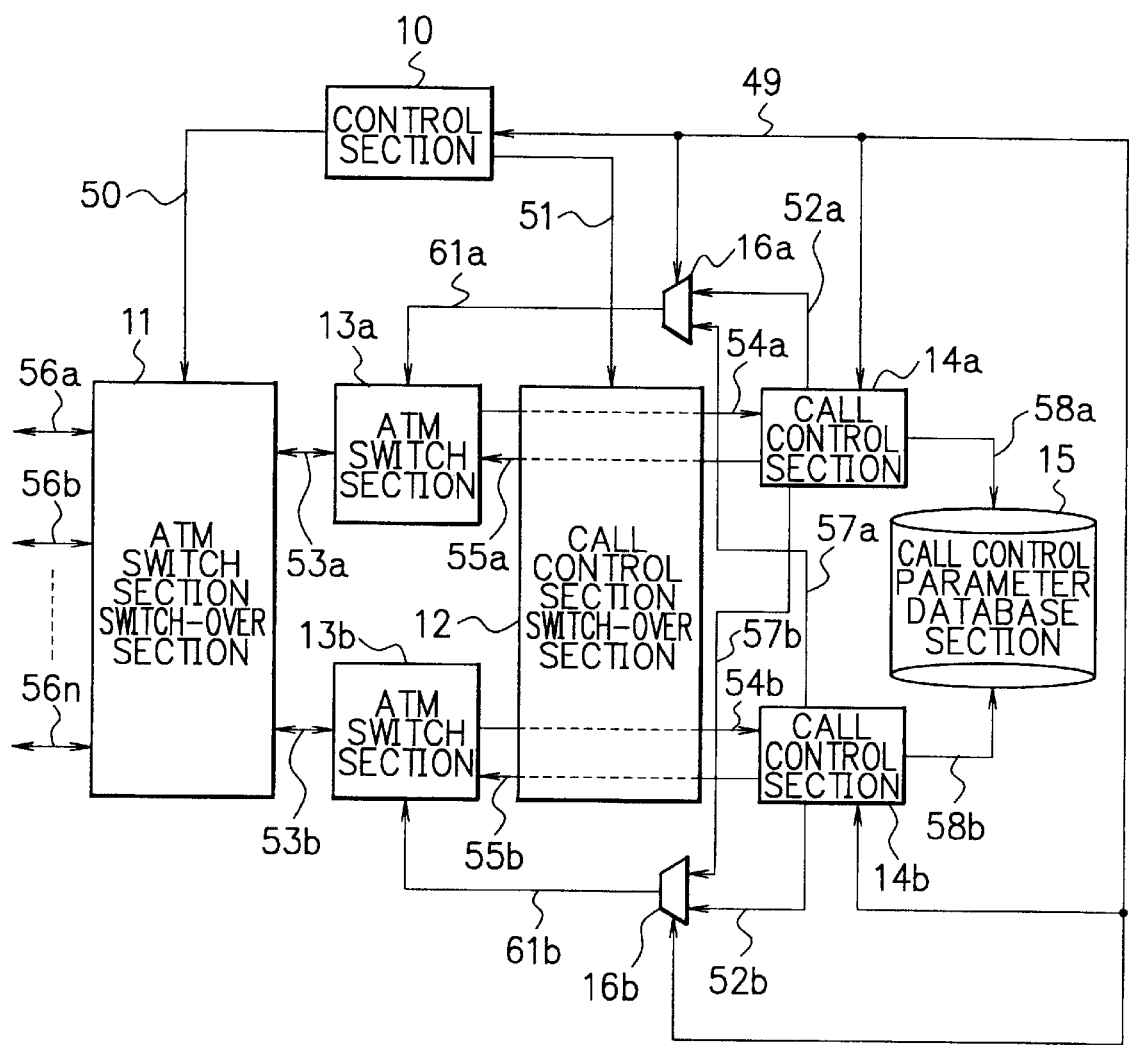
FIG. 2 is a block diagram showing the composition of a duplex call control unit in accordance with an embodiment of the present invention.

FIG. 2 is a block diagram showing the composition of a duplex call control unit in accordance with an embodiment of the present invention. The duplex call control unit of FIG. 2 comprises a control section 10, an ATM switch section 13a of the operating system, an ATM switch section 13b of the standby system, a call control section 14a of the operating system, a call control section 14b of the standby system, an ATM switch section switch-over section 11, a call control section switch-over section 12, call control parameter database section 15, and selectors 16a and 16b.

The control section 10 is implemented by, for example, a microprocessor unit which is composed of a CPU (Central Processing Unit), ROM (Read Only Memory), RAM (Random Access Memory), etc., and appropriate software. Such software for realizing the operations of the control section 10 is stored in one or more record mediums. The ATM switch section switch-over section 11 is implemented by, for example, a bus switching LSI. The call control section switch-over section 12 is also implemented by, for example, a bus switching LSI. Each of the ATM switch sections 13a and 13b is implemented by, for example, an ATM switch module LSI. Each of the call control sections 14a and 14b is implemented by, for example, a microprocessor unit which is composed of a CPU, ROM, RAM, etc., and appropriate software. Such software for realizing the operations of each call control section (14a, 14b) is stored in one or more record mediums. The call control parameter database section 15 is implemented by, for example, flash RAM.

ATM lines 56a, 56b, . . . , 56n for inputting/outputting ATM cells from/to ATM networks, subscriber terminals, etc.

are connected to the ATM switch section switch-over section 11. The control section 10 is connected to the ATM switch section switch-over section 11 and the call control section switch-over section 12 by buses 50 and 51, respectively. The control section 10 is also connected to other components of the duplex call control unit by buses 49 etc. The ATM switch section switch-over section 11 is connected to the operating system ATM switch section 13a and the standby system ATM switch section 13b by buses 53a and 53b, respectively.

The control section 10 monitors the statuses of the components of the duplex call control unit by means of polling etc. and outputs signals (instructions) for controlling the switch-over between the operating system and the standby system depending on the statuses of the components.

The ATM switch section switch-over section 11 controls the connection between the ATM lines (56a, 56b, ..., 56n) and the buses 53a and 53b and thereby controls switch-over of the operations of the operating system ATM switch section 13a and the standby system ATM switch section 13b.

The call control section switch-over section 12 controls the connection between the ATM switch sections (13a, 13b) and the call control sections (14a, 14b), and thereby controls switch-over of the operations of the operating system call control section 14a and the standby system call control section 14b.

The call control parameter database section 15 is provided to the duplex call control unit for storing call control parameters with respect to SVC connection information and call control protocol statuses. The SVC connection information is information with regard to SVC connection which has already been established. The call control protocol statuses are statuses of call control protocols for SVC connection which is being established or being released. The call control parameters with respect to SVC connection information which are stored in the call control parameter database section 15 include: VPI (Virtual Path Identifier), VCI (Virtual Channel Identifier), traffic information (priority, QoS (Quality of Service), etc.), band width, and call reference, for example. The call control parameters with respect to call control protocol statuses which are stored in the call control parameter database section 15 include call control parameters for the SSCOP layer, SSCF layer and call control parameters for the signaling layer (UNI signaling). The call control parameters for the SSCOP layer include: SSCOP state variables (ITU-T Q.2110 pages 17, 18 (July 1994)), SSCOP timer value (ITU-T Q.2110 pages 19, 20), SSCOP parameters (ITU-T Q.2110 pages 20, 21), maximum SSCOP SDU (Service Data Unit) size (ITU-T Q.2130 page 14 (July 1994)), and maximum SSCOP UU size(j) (ITU-T Q.2130 page 14 (July 1994)), for example, for each SSCOP link connections. The call control parameters for the SSCF layer include: SSCF state information(ITU-T Q.2130 page 7 (July 1994), for example, for each SSCOP link connections. The call control parameters for the signaling layer include: call reference and status for call reference, for example, for each calls. The call control parameters stored in the call control parameter database section 15 are updated and referred to by the operating system call control section 14a and the standby system call control section 14b.

The switching of the selectors 16a and 16b are controlled according to signals (instructions) which are supplied from the control section 10. The selectors 16a and 16b are used for connecting buses when SVC connection information is set to each of the operating system ATM switch section 13a and the standby system ATM switch section 13b by the operating system call control section 14a or the standby system call control section 14b.

Data transmission from the operating system ATM switch section 13a to the operating system call control section 14a is executed via a (unidirectional) bus 54a, and data transmission from the operating system call control section 14a to the operating system ATM switch section 13a is executed via a (unidirectional) bus 55a. Data transmission from the standby system ATM switch section 13b to the standby system call control section 14b is executed via a (unidirectional) bus 54b, and data transmission from the standby system call control section 14b to the standby system ATM switch section 13b is executed via a (unidirectional) bus 55b.

Under normal operating conditions, the operating system call control section 14a executes establishment/release of SVC connection (setting of SVC connection information) to the operating system ATM switch section 13a via buses 52a and 61a, and the standby system call control section 14b executes establishment/release of the same SVC connection (setting of SVC connection information) to the standby system ATM switch section 13b via buses 52b and 61b. The operating system call control section 14a is also connected to the selector 16b via a bus 57b and the standby system call control section 14b is also connected to the selector 16a via a bus 57a so that the establishment/release of SVC connection to both ATM switch sections 13a and 13b can be executed by one call control section 14a or 14b in cases where the operating system call control section 14a or the standby system call control section 14b can not work (in cases where failure, maintenance etc. occurred to one of the call control sections 14a and 14b).

In the following, the operation of the duplex call control unit of FIG. 2 will be described in detail.

ATM cells sent from ATM networks, ATM subscriber terminals, etc. are supplied to the ATM switch section switch-over section 11 via the ATM lines 56a, 56b, ..., 56n. The ATM switch section switch-over section 11 distributes the received ATM cells to the operating system ATM switch section 13a and the standby system ATM switch section 13b, according to a signal (instruction) supplied from the control section 10 via the bus 50.

The control section 10 monitors the components of the duplex call control unit by polling etc. as mentioned before, and outputs a normal operation instruction when the ATM switch sections 13a and 13b and the call control sections 14a and 14b are working correctly without failure, maintenance, etc. The control section 10 outputs an operating system ATM switch section cut-off instruction when the operating system ATM switch section 13a is not working correctly due to failure, maintenance, etc. The control section 10 outputs an operating system call control section cut-off instruction when the operating system call control section 14a is not working correctly due to failure, maintenance, etc. The control section 10 outputs an operating system cut-off instruction when both the operating system ATM switch section 13a and the operating system call control section 14a are not working correctly due to failure, maintenance, etc.

Figure 3A:
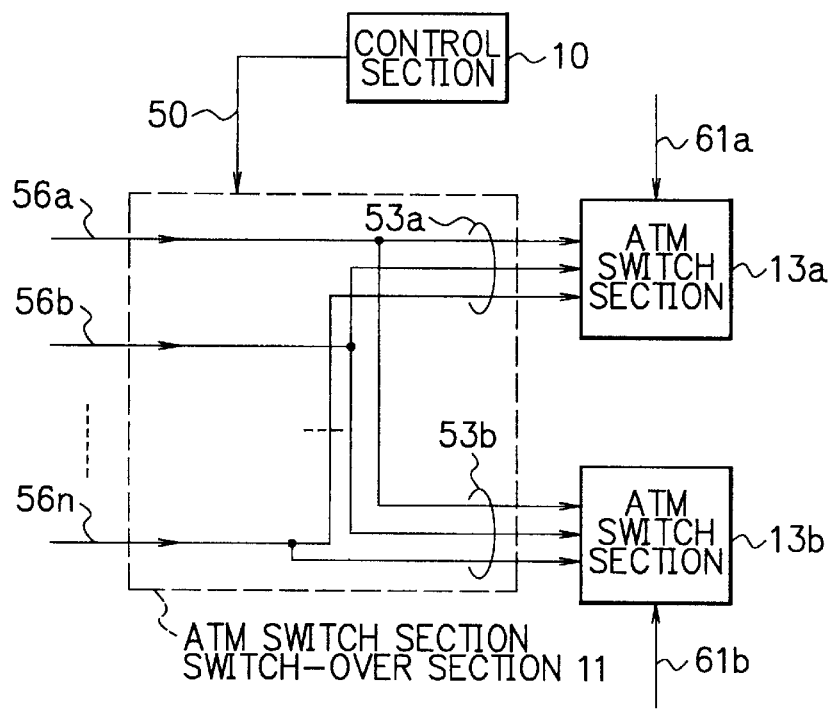
FIG. 3A is a schematic diagram showing bus connection of an ATM switch section switch-over section of the duplex call control unit of FIG. 2 for distributing ATM cells supplied via ATM lines to an operating system ATM switch section and a standby system ATM switch section of the duplex call control unit of FIG. 2.

FIG. 3A is a schematic diagram showing bus connection of the ATM switch section switch-over section 11 for distributing ATM cells supplied via the ATM lines 56a, 56b, ..., 56n to the ATM switch sections 13a and 13b. When the normal operation instruction or the operating system call control section cut-off instruction is supplied from the control section 10 via the bus 50 (i.e. when both the ATM switch sections 13a and 13b are working without failure, maintenance, etc.), the ATM switch section switch-over section 11 duplicates all the ATM cells received via the ATM lines 56a, 56b, . . . , 56n, and sends the ATM cells to both the operating system ATM switch section 13a and the standby system ATM switch section 13b via the buses 53a and 53b respectively.

When the operating system ATM switch section cut-off instruction or the operating system cut-off instruction is supplied from the control section 10 via the bus 50 (i.e. when the operating system ATM switch section 13a is not working due to failure, maintenance, etc.), the ATM switch section switch-over section 11 disables the bus 53a which is connected to the operating system ATM switch section 13a which is not working, and thereby stops the ATM cell duplication. Thereby the ATM cells received via the ATM lines 56a, 56b, . . . , 56n are supplied to the working standby system ATM switch section 13b only.

Figure 3B:
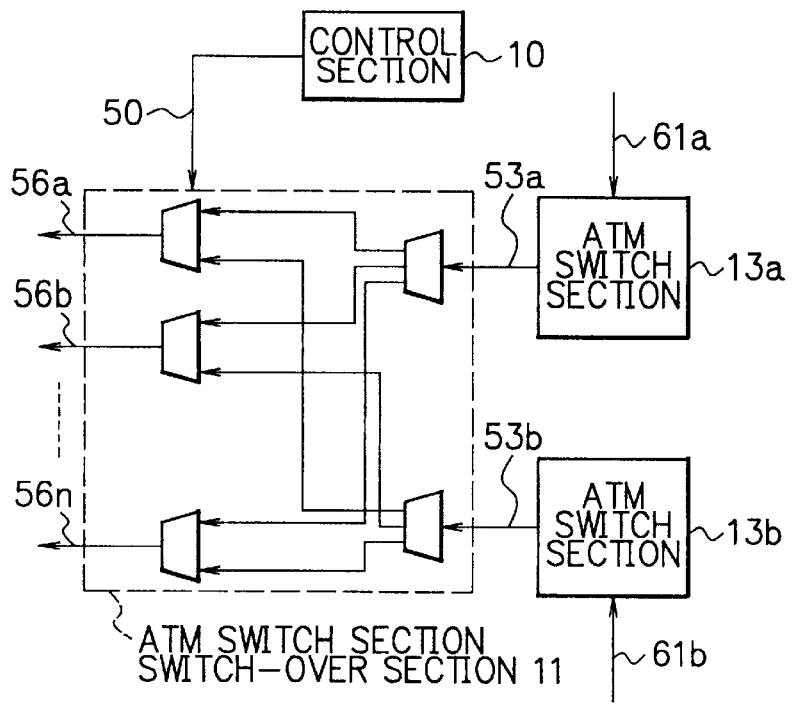
FIG. 3B is a schematic diagram showing bus connection of the ATM switch section switch-over section for transmitting ATM cells supplied from the ATM switch sections to the ATM lines.

FIG. 3B is a schematic diagram showing bus connection of the ATM switch section switch-over section 11 for transmitting ATM cells supplied from the ATM switch sections 13a and 13b to the ATM lines 56a, 56b, . . . , 56n. In the case where the normal operation instruction or the operating system call control section cut-off instruction is supplied from the control section 10 via the bus 50 (i.e. in the case where both the ATM switch sections 13a and 13b are working without failure, maintenance, etc.), the ATM switch section switch-over section 11 enables the bus 53a which is connected to the operating system ATM switch section 13a and disables the bus 53b which is connected to the standby system ATM switch section 13b, and thereby transmits ATM cells supplied from the operating system ATM switch section 13a to the ATM lines 56a, 56b, . . . , 56n. In this case, ATM cells supplied from the standby system ATM switch section 13b are abandoned in the ATM switch section switch-over section 11.

In the case where the operating system ATM switch section cut-off instruction or the operating system cut-off instruction is supplied from the control section 10 via the bus 50 (i.e. when the operating system ATM switch section 13a is not working due to failure, maintenance, etc.), the ATM switch section switch-over section 11 enables the bus 53b which is connected to the standby system ATM switch section 13b and disables the bus 53a which is connected to the operating system ATM switch section 13a, and thereby transmits ATM cells supplied from the standby system ATM switch section 13b to the ATM lines 56a, 56b, , 56n.

By the above operation of the ATM switch section switch-over section 11, even if the status of the duplex call control unit changed from the status where both ATM switch sections 13a and 13b are working to the status where the operating system ATM switch section 13a is not working due to failure, maintenance, etc., the missing or loss of the ATM cells which are being communicated is prevented. Further, under normal operating conditions, the same (duplicated) ATM cells are supplied to the operating system ATM switch section 13a and the standby system ATM switch section 13b, and thus the same call control cells are extracted by the ATM switch sections 13a and 13b and supplied to the call control section switch-over section 12. Therefore, even if one of the ATM switch sections (13a or 13b) stopped working, the extraction of the call control cells from the received ATM cells can be continued by the operating system ATM switch section 13a or the standby system ATM switch section 13b, and the extracted call control cells can be supplied to the call control section switch-over section 12.

Each ATM switch section (13a, 13b) which received the ATM cells from the ATM switch section switch-over section 11 extracts particular call control cells (in which specific VPI/VCI for call control (VPI=0, VCI=5) have been set) from headers of the ATM cells, and sends the call control cells to the call control section switch-over section 12 via the bus (54a, 54b).

Figure 4A:
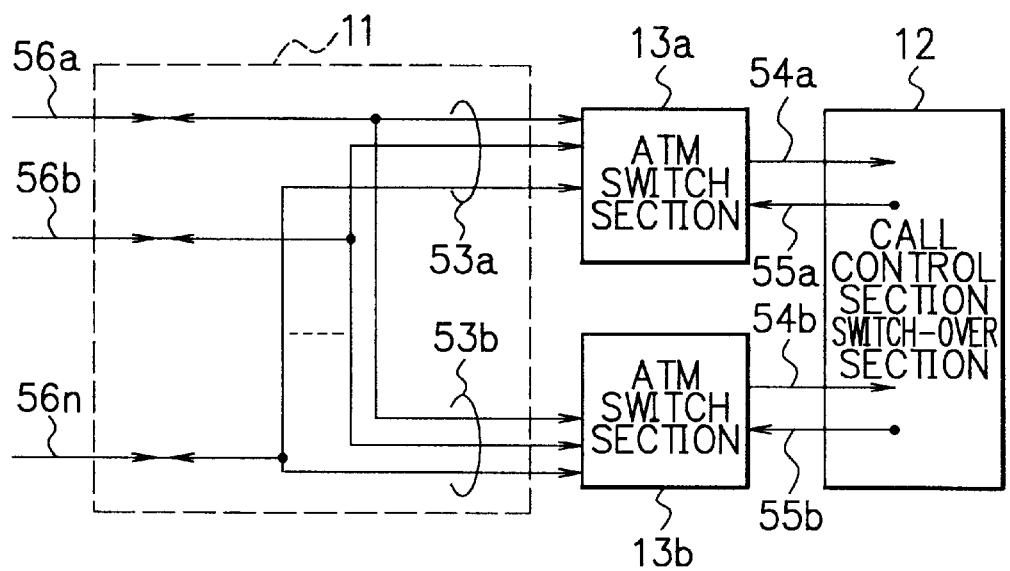
FIG. 4A is a schematic diagram showing bus connection between the ATM switch section switch-over section and a call control section switch-over section of the duplex call control unit of FIG. 2 for communicating ATM cells and call control cells when both the operating system ATM switch section and the standby system ATM switch section are working.

FIG. 4A is a schematic diagram showing bus connection between the ATM switch section switch-over section 11 and the call control section switch-over section 12 for communicating ATM cells and call control cells in the case where both the operating system ATM switch section 13a and the standby system ATM switch section 13b are working (that is, in the case where the normal operation instruction or the operating system call control section cut-off instruction is supplied from the control section 10). Referring to FIG. 4A, each ATM switch section (13a, 13b) extracts the call control cells from the ATM cells supplied from the ATM switch section switch-over section 11, and sends the extracted call control cells to the call control section switch-over section 12 via the bus (54a, 54b). In the case where the normal operation instruction is outputted by the control section 10, the operating system ATM switch section 13a also receives call control cells (which have been generated by the operating system call control section 14a as response) from the call control section switch-over section 12 via the bus 55a, inserts the call control cells in suitable ATM cells, and sends the ATM cells to the ATM switch section switch-over section 11. In the case where the operating system call control section cut-off instruction is outputted by the control section 10, the operating system ATM switch section 13a also receives call control cells (which have been generated by the standby system call control section 14b as response) from the call control section switch-over section 12 via the bus 55a, inserts the call control cells in suitable ATM cells, and sends the ATM cells to the ATM switch section switch-over section 11.

Figure 4B:
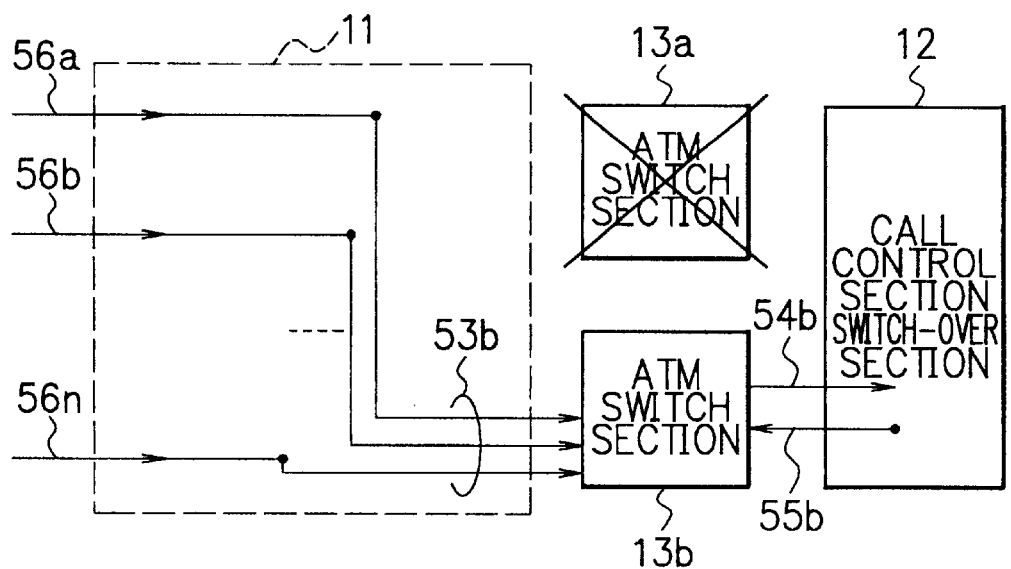
FIG. 4B is a schematic diagram showing bus connection between the ATM switch section switch-over section and the call control section switch-over section for communicating ATM cells and call control cells when only the standby system ATM switch section is working due to failure, maintenance, etc. of the operating system ATM switch section.

FIG. 4B is a schematic diagram showing bus connection between the ATM switch section switch-over section 11 and the call control section switch-over section 12 for communicating ATM cells and call control cells in the case where only the standby system ATM switch section 13b is working due to failure, maintenance, etc. of the operating system ATM switch section 13a (that is, in the case where the operating system ATM switch section cut-off instruction or the operating system cut-off instruction is supplied from the control section 10). Referring to FIG. 4B, the ATM switch section switch-over section 11 does not execute the ATM cell duplication and enables the bus 53b only, and thereby distributes the ATM cells supplied via the ATM lines 56a, 56b, . . . , 56n to the standby system ATM switch section 13b only. The standby system ATM switch section 13b extracts the call control cells from the ATM cells and sends the extracted call control cells to the call control section switch-over section 12 via the bus 54b. In this case where the operating system ATM switch section cut-off instruction or the operating system cut-off instruction is outputted by the control section 10, the standby system ATM switch section 13b also receives call control cells (which have been generated by the standby system call control section 14b as response) from the call control section switch-over section 12 via the bus 55a, inserts the call control cells in suitable ATM cells, and sends the ATM cells to the ATM switch section switch-over section 11.

When the operating system ATM switch section 13a is restored and restarts working from the state shown in FIG. 4B (where the operating system ATM switch section cut-off instruction or the operating system cut-off instruction is outputted by the control section 10), the control section 10 outputs the normal operation instruction or the operating system call control section cut-off instruction. The ATM switch section switch-over section 11 which received the normal operation instruction or the operating system call control section cut-off instruction restores the bus connection to the bus connection shown in FIG. 4A.

The call control section switch-over section 12 receives the call control cells from both ATM switch sections 13*a* and 13*b*, or from the standby system ATM switch section 13*b* only, depending on the bus connections which have been explained above. The call control section switch-over section 12 controls the distribution of the received call control cells to the operating system call control section 14*a* and the standby system call control section 14*b* as follows, depending on the instructions supplied from the control section 10.

Figure 5A:
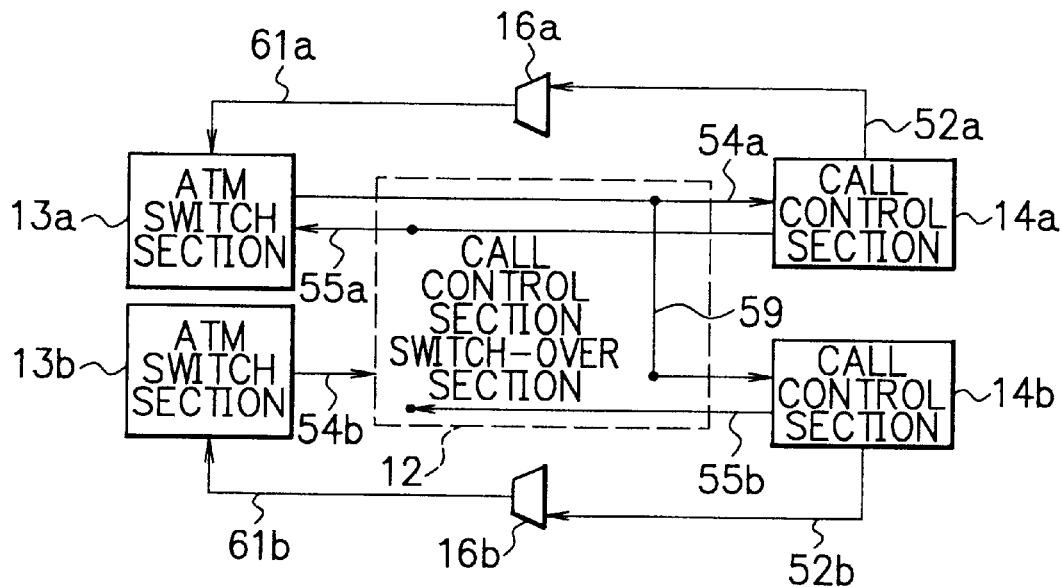
FIG. 5A is a schematic diagram showing bus connection which is executed by the call control section switch-over section and selectors of the duplex call control unit of FIG. 2 when a normal operation instruction is supplied.

FIG. 5A is a schematic diagram showing bus connection which is executed by the call control section switch-over section 12 and the selectors 16*a* and 16*b* in the case where the normal operation instruction is supplied from the control section 10 via the bus 51 (that is, in the case where both ATM switch sections 13*a* and 13*b* and both call control sections 14*a* and 14*b* are working without failure, maintenance, etc.).

In the case of FIG. 5A, the call control section switch-over section 12 duplicates call control cells supplied from the operating system ATM switch section 13*a*, and sends the same (duplicated) call control cells to the operating system call control section 14*a* (via the bus 54*a*) and the standby system call control section 14*b* (via a bus 59 and the bus 54*b*). Call control cells supplied from the standby system ATM switch section 13*b* are abandoned in the call control section switch-over section 12. The call control section switch-over section 12 also receives call control cells from the operating system call control section 14*a* and sends the call control cells to the operating system ATM switch section 13*a* via the bus 55*a*. Call control cells supplied from the standby system call control section 14*b* via the bus 55*b* are abandoned in the call control section switch-over section 12.

Since the normal operation instruction is supplied from the control section 10, the selector 16*a* selects the bus 52*a* (which is connected to the operating system call control section 14*a*) as its input and the selector 16*b* selects the bus 52*b* (which is connected to the standby system call control section 14*b*) as its input, thereby the operating system call control section 14*a* sets SVC connection information (as the result of the call control) to the operating system ATM switch section 13*a* via the buses 52*a* and 61*a*, and the standby system call control section 14*b* sets the SVC connection information (as the result of the call control) to the standby system ATM switch section 13*b* via buses 52*b* and 61*b*. By such bus connection and operation shown in FIG. 5A, the duplex composition of the ATM switch sections (13*a* and 13*b*) and the duplex composition of the call control sections (14*a* and 14*b*) are maintained.

Figure 5B:
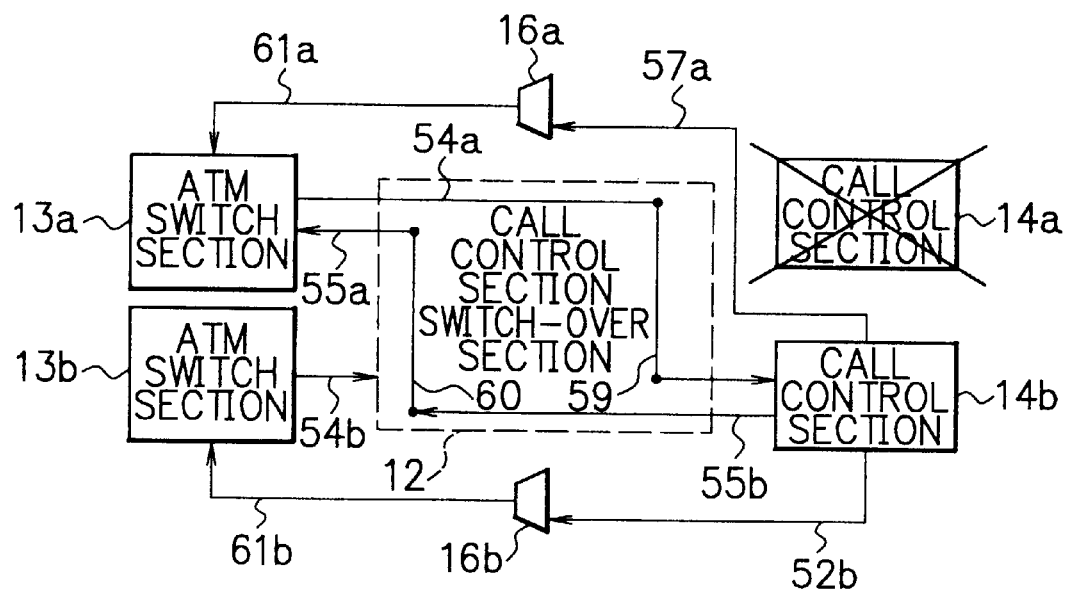
FIG. 5B is a schematic diagram showing bus connection which is executed by the call control section switch-over section and the selectors when an operating system call control section cut-off instruction is supplied.

FIG. 5B is a schematic diagram showing bus connection which is executed by the call control section switch-over section 12 and the selectors 16*a* and 16*b* in the case where the operating system call control section cut-off instruction is supplied from the control section 10 via the bus 51 (that is, in the case where the operating system call control section 14*a* is not working due to failure, maintenance, etc. (the standby system call control section 14*b* and both ATM switch sections 13*a* and 13*b* are working without failure, maintenance, etc.)).

In the case of FIG. 5B, the call control section switch-over section 12 disables rear part of the bus 54*a*, thereby stops the duplication of the call control cells, and thereby sends the call control cells supplied from the operating system ATM switch section 13*a* to the standby system call control section 14*b* only via the bus 59 and the bus 54*b*. The call control section switch-over section 12 disables front part of the bus 55*a* and enables a bus 60 which connects front part of the bus 55*b* and rear part of the bus 55*a* so that call control cells can be transferred from the standby system call control section 14*b* to the operating system ATM switch section 13*a* via the buses 55*b*, 60 and 55*a*.

Since the operating system call control section cut-off instruction is supplied from the control section 10, the selector 16*a* selects the bus 57*a* (which is connected to the standby system call control section 14*b*) as its input and the selector 16*b* selects the bus 52*b* (which is connected to the standby system call control section 14*b*) as its input, thereby the standby system call control section 14*b* sets SVC connection information (as the result of the call control) to the operating system ATM switch section 13*a* via the buses 57*a* and 61*a*, and to the standby system ATM switch section 13*b* via the buses 52*b* and 61*b*. By such bus connection and operation shown in FIG. 5B, the duplex composition of the ATM switch sections (13*a* and 13*b*) is maintained.

Figure 5C:
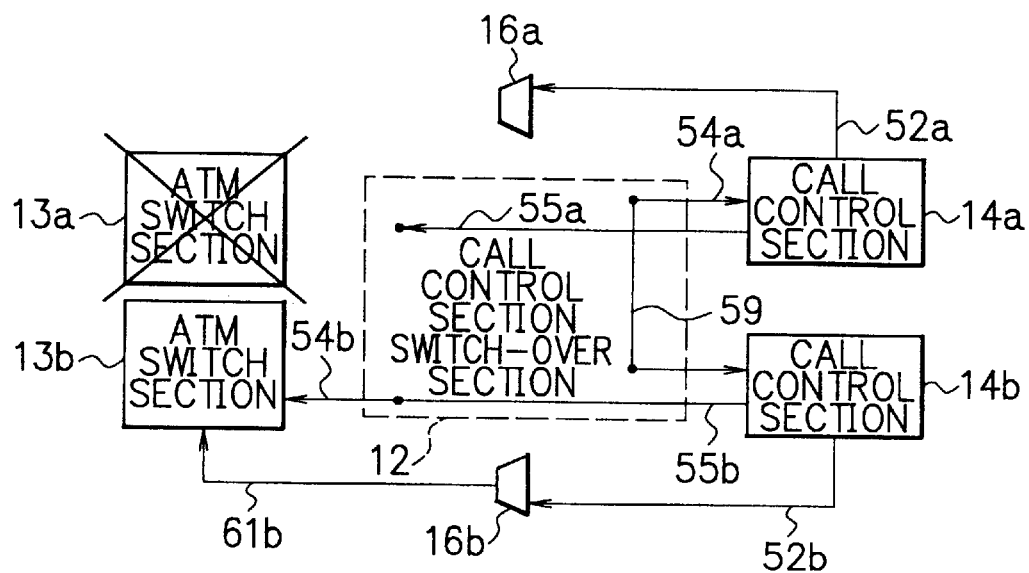
FIG. 5C is a schematic diagram showing bus connection which is executed by the call control section switch-over section and the selectors when an operating system ATM switch section cut-off instruction is supplied.

FIG. 5C is a schematic diagram showing bus connection which is executed by the call control section switch-over section 12 and the selectors 16*a* and 16*b* in the case where the operating system ATM switch section cut-off instruction is supplied from the control section 10 via the bus 51 (that is, in the case where the operating system ATM switch section 13*a* is not working due to failure, maintenance, etc. (the standby system ATM switch section 13*b* and both call control sections 14*a* and 14*b* are working without failure, maintenance, etc.)). In this case, the ATM switch section switch-over section 11 is also supplied with the operating system ATM switch section cut-off instruction from the control section 10, and thus bus connection in the ATM switch section switch-over section 11 is set as shown in FIG. 4B.

In the case of FIG. 5C, the call control section switch-over section 12 disables front part of the bus 54*a* and enables front part of the bus 54*b* (in comparison with the bus connection shown in FIG. 5A) in order to stop call control cell reception from the operating system ATM switch section 13*a* and start call control cell reception from the standby system ATM switch section 13*b*. Thereafter, the call control section switch-over section 12 receives call control cells from the standby system ATM switch section 13*b* and sends the call control cells to the operating system call control section 14*a* (via the buses 59 and 54*a*) and the standby system call control section 14*b* (via the bus 54*b*). The call control section switch-over section 12 also receives call control cells from the standby system call control section 14*b* and sends the call control cells to the standby system ATM switch section 13*b* via the bus 55*b*. Call control cells supplied from the operating system call control section 14*a* via the bus 55*a* are abandoned in the call control section switch-over section 12.

Since the operating system ATM switch section cut-off instruction is supplied from the control section 10 (since the operating system ATM switch section 13*a* is not working), it is impossible for the operating system call control section 14*a* to set SVC connection information (as the result of the call control) to the operating system ATM switch section 13*a* via the buses 52*a* and 61*a*. In this case, the selector 16*a* which is supplied with the operating system ATM switch section cut-off instruction disables its output and does not output call control cells to the operating system ATM switch section 13a. The selector 16b which is supplied with the operating system ATM switch section cut-off instruction selects the bus 52b (which is connected to the standby system call control section 14b) as its input, thereby the standby system call control section 14b sets SVC connection information (as the result of the call control) to the standby system ATM switch section 13b via the buses 52b and 61b. By such bus connection and operation shown in FIG. 5C, the duplex composition of the call control sections (14a and 14b) is maintained.

Figure 5D:
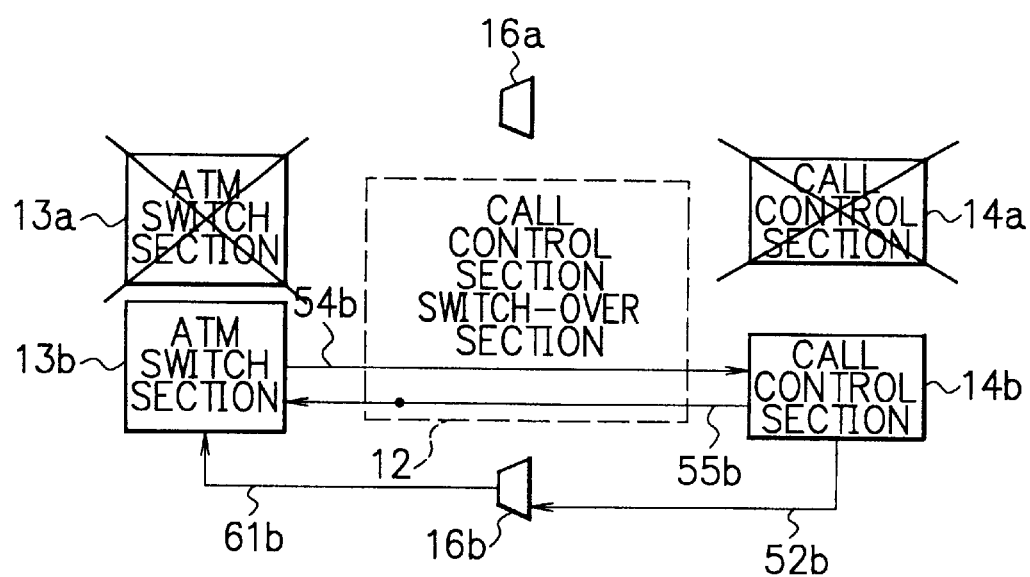
FIG. 5D is a schematic diagram showing bus connection which is executed by the call control section switch-over section and the selectors when an operating system cut-off instruction is supplied.

FIG. 5D is a schematic diagram showing bus connection which is executed by the call control section switch-over section 12 and the selectors 16a and 16b in the case where the operating system cut-off instruction is supplied from the control section 10 via the bus 51 (that is, in the case where the operating system ATM switch section 13a and the operating system call control section 14a are not working due to failure, maintenance, etc. (the standby system ATM switch section 13b and the standby system call control section 14b are working without failure, maintenance, etc.)). In this case, the ATM switch section switch-over section 11 is also supplied with the operating system cut-off instruction from the control section 10, and thus bus connection in the ATM switch section switch-over section 11 is set as shown in FIG. 4B.

In the case of FIG. 5D, the call control section switch-over section 12 enables the buses 54b and 55b only so as to connect the standby system ATM switch section 13b and the standby system call control section 14b. The call control section switch-over section 12 receives call control cells from the standby system ATM switch section 13b and sends the call control cells to the standby system call control section 14b via the bus 54b. The call control section switch-over section 12 also receives call control cells from the standby system call control section 14b and sends the call control cells to the standby system ATM switch section 13b via the bus 55b.

Since the operating system cut-off instruction is supplied from the control section 10 (since the operating system ATM switch section 13a and the operating system call control section 14a are not working), it is impossible for the operating system call control section 14a to set SVC connection information (as the result of the call control) to the operating system ATM switch section 13a via the buses 52a and 61a. In this case, the selector 16a which is supplied with the operating system cut-off instruction disables its output and does not output call control cells to the operating system ATM switch section 13a. The selector 16b which is supplied with the operating system cut-off instruction selects the bus 52b (which is connected to the standby system call control section 14b) as its input, thereby the standby system call control section 14b sets SVC connection information (as the result of the call control) to the standby system ATM switch section 13b via the buses 52b and 61b.

Incidentally, while the ATM switch section 13a has been referred to as an "operating system ATM switch section 13a" and the ATM switch section 13b has been referred to as an "standby system ATM switch section 13b" (that is, the functions of the ATM switch section 13a has been fixed as an ATM switch section for the "operating system" and the functions of the ATM switch section 13b has been fixed as an ATM switch section for the "standby system") in the above explanation, it is also possible to let the ATM switch sections 13a and 13b operate relatively as the "operating system ATM switch section" or the "standby system ATM switch section" depending on cases. Concretely, when the ATM switch section 13a which has been operating as the "operating system ATM switch section" stopped working due to failure, maintenance, etc., it is also possible to let the ATM switch section 13b thereafter operate as the "operating system ATM switch section" and let the ATM switch section 13a operate as the "standby system ATM switch section". In such relative operation, when the ATM switch section 13a ("standby system ATM switch section") is restored and restarts working, the ATM switch section 13a remains as the "standby system ATM switch section" and the ATM switch section 13b remains as the "operating system ATM switch section".

In the same way, while the call control section 14a has been referred to as an "operating system call control section 14a" and the call control section 14b has been referred to as an "standby system call control section 14b" (that is, the functions of the call control section 14a has been fixed as a call control section for the "operating system" and the functions of the call control section 14b has been fixed as a call control section for the "standby system") in the above explanation, it is also possible to let the call control sections 14a and 14b operate relatively as the "operating system call control section" or the "standby system call control section" depending on cases. Concretely, when the call control section 14a which has been operating as the "operating system call control section" stopped working due to failure, maintenance, etc., it is also possible to let the call control section 14b thereafter operate as the "operating system call control section" and let the call control section 14a operate as the "standby system call control section". In such relative operation, when the call control section 14a ("standby system call control section") is restored and restarts working, the call control section 14a remains as the "standby system call control section" and the call control section 14b remains as the "operating system call control section".

Such operating/standby relative operation is implemented by bus connection of the ATM switch section switch-over section 11, the call control section switch-over section 12 and the selectors 16a and 16b depending on instructions which are supplied from the control section 10, similarly to the operations which have been explained referring to FIGS. 3A through 5D. The control section 10 always grasps which of the ATM switch sections (13a or 13b) is the "operating system ATM switch section" now and which of the call control sections (14a or 14b) is the "operating system call control section" now, based on the result of the monitoring (by means of polling etc.), instructions it outputted. etc. The control section 10 instructs the ATM switch section switch-over section 11, call control section switch-over section 12 and the selectors 16a and 16b execute bus connection similarly to the above explanation, depending on which ATM switch section (13a or 13b) is the "operating system ATM switch section" now and which call control section (14a or 14b) is the "operating system call control section" now.

The operating system call control section 14a and the standby system call control section 14b are designed to receive the same call control cells under normal operating conditions. However, mismatch of statuses of call control parameters can occur between the operating system call control section 14a and the standby system call control section 14b for some reasons. Further, when the status of the duplex call control unit changes from the status shown in FIG. 5B to the status shown in FIG. 5A, when the status changes from the status shown in FIG. 5D to the status shown in FIG. 5C, etc., a call control section (14a or 14b) which has not been working has to obtain SVC connection information and call control protocol statuses which has been operated and held by the other call control section (14b or 14a). Therefore, the call control sections 14a and 14b use the call control parameter database section 15 for checking the SVC connection information and the call control protocol statuses which are now being operated and for setting (updating) the SVC connection information and the call control protocol statuses of itself.

The operating system call control section 14a makes access to the call control parameter database section 15 via a bus 58a. The standby system call control section 14b makes access to the call control parameter database section 15 via a bus 58b. For example, in the case of FIG. 5B where the operating system call control section 14a is not working, the standby system call control section 14b executes update of the call control parameters which are stored in the call control parameter database section 15. When the operating system call control section 14a is restored and the duplex operation is restarted, the operating system call control section 14a refers to the call control parameter database section 15 and thereby acquires the call control parameters with respect to SVC connection information and call control protocol statuses.

As mentioned before, the call control parameters stored in the call control parameter database section 15 include call control parameters with respect to SVC connection information and call control parameters with respect to call control protocol statuses. The SVC connection information is information with regard to SVC connection which has already been established. The call control protocol statuses are statuses of call control protocols for SVC connection which is being established or being released. The call control parameters with respect to SVC connection information include: VPI, VCI, traffic information (priority, QoS (Quality of Service), etc.), band width, and call reference, for example. The call control parameters with respect to call control protocol statuses include call control parameters for the SSCOP layer, SSCF layer and call control parameters for the signaling layer (UNI signaling). The call control parameters for the SSCOP layer include: SSCOP state variables, SSCOP timer value, SSCOP parameters, maximum SSCOP SDU size, and maximum SSCOP UU sizes), for example, for each SSCOP link connections. The call control parameters for the SSCF layer include: SSCF state information, for example, for each SSCOP link connections. The call control parameters for the signaling layer include: call reference and status for call reference, for example, for each calls, as mentioned before.

When both the operating system call control section 14a and the standby system call control section 14b are working as shown in FIG. 5A or FIG. 5C (that is, when the normal operation instruction or the operating system ATM switch section cut-off instruction is outputted by the control section 10), the operating system call control section 14a updates the call control parameters stored in the call control parameter database section 15 during processing call control cells. The standby system call control section 14b refers to the call control parameters stored in the call control parameter database section 15. If call control parameters held by the standby system call control section 14b did not match the call control parameters of the call control parameter database section 15, the standby system call control section 14b forcibly replaces its call control parameters by the call control parameters of the call control parameter database section 15, and adjust its call control protocol statuses and SVC connection information according to the new call control parameters.

When the operating system call control section 14a is not working as shown in FIG. 5B or FIG. 5D (that is, when the operating system call control section cut-off instruction or the operating system cut-off instruction is outputted by the control section 10), the standby system call control section 14b updates the call control parameters stored in the call control parameter database section 15 during processing call control cells.

When the operating system call control section 14a which has not been working restarts working from its initial state, the operating system call control section 14a obtains call control parameters stored in the call control parameter database section 15, forcibly sets its call control parameters as those of the call control parameter database section 15, adjusts its call control protocol statuses and SVC connection information according to the new call control parameters, and thereafter sends an operating system call control section restart signal to the control section 10. The control section 10 which received the operating system call control section restart signal outputs the normal operation instruction or the operating system ATM switch section cut-off instruction, and thereby the duplex call control operation is restarted.

In the case where the aforementioned "operating/standby relative operation" is employed, the call control parameters stored in the call control parameter database section 15 are updated by the call control section 14a or 14b that is now regarded as the "operating system ATM switch section", and are referred to by the call control section 14b or 14a that is now regarded as the "standby system ATM switch section". The call control sections 14a and 14b are informed by the control section 10 about which (14a or 14b) is the "operating system ATM switch section" and which (14b or 14a) is the "standby system ATM switch section", and execute the update and reference of the call control parameter database section 15 according to the information concerning "operation system" and "standby system".

When one of the call control sections (14a or 14b) is not working, the other call control section (14b or 14a) updates the call control parameters stored in the call control parameter database section 15 during processing call control cells.

When the call control section (14a or 14b) which has not been working restarts working from its initial state, the call control section (14a or 14b) acquires call control parameters stored in the call control parameter database section 15, forcibly sets its call control parameters as those of the call control parameter database section 15, adjusts its call control protocol statuses and SVC connection information according to the new call control parameters, and thereafter sends a call control section restart signal (of the call control section 14a or the call control section 14b) to the control section 10. The control section 10 which received the call control section restart signal outputs an instruction (which is similar to the normal operation instruction or the operating system ATM switch section cut-off instruction), and thereby the duplex call control operation is restarted.

In the following, some examples of implementation of the duplex call control unit according to the embodiment of the present invention will be explained.

Figure 6:
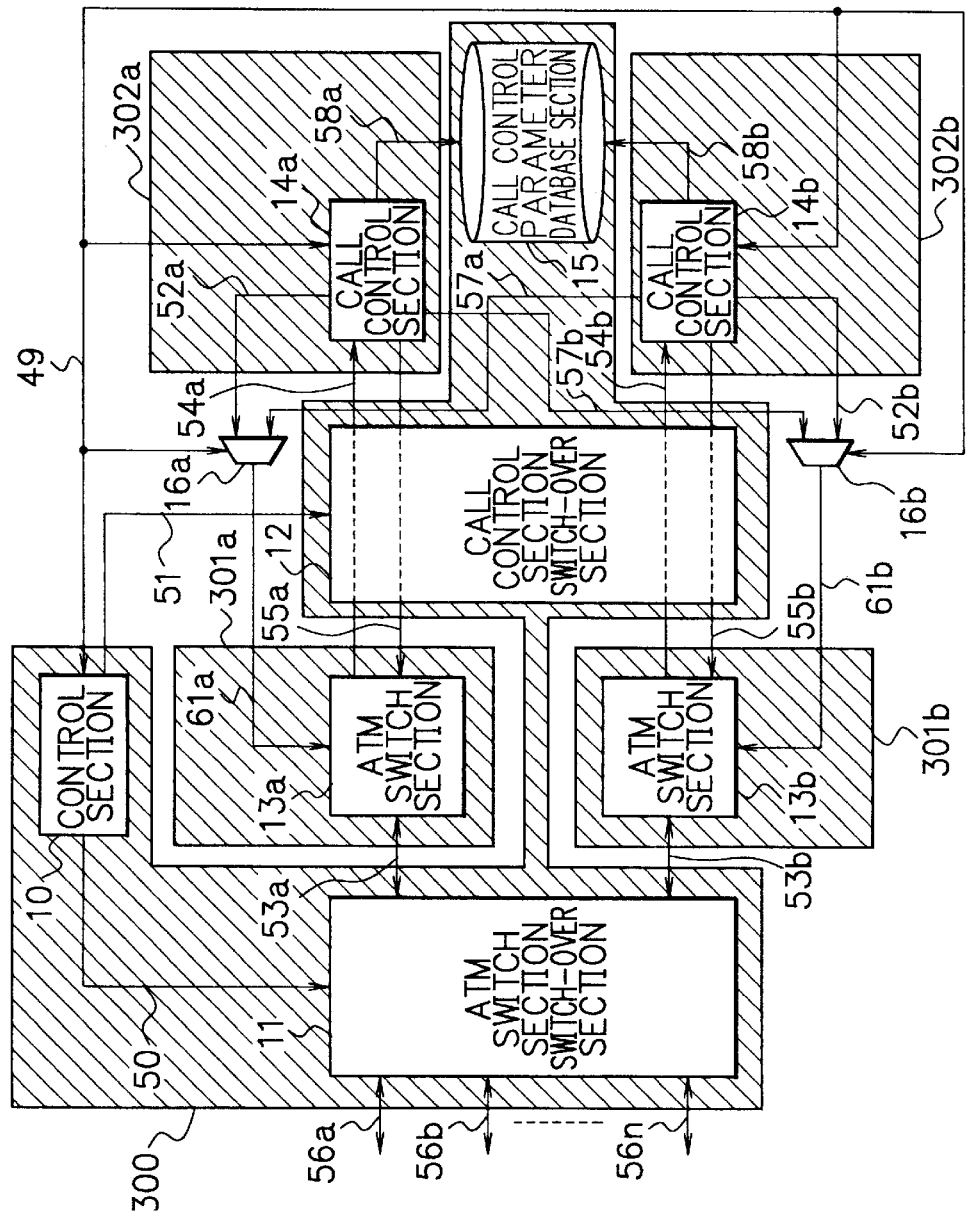
FIG. 6 is a block diagram showing a first example of implementation of the duplex call control unit according to the embodiment of the present invention.

FIG. 6 is a block diagram showing a first example of implementation of the duplex call control unit according to the embodiment of the present invention. Referring to FIG. 6, the control section 10, the ATM switch section switch-over section 11, the call control section switch-over section 12 and the call control parameter database section 15 are mounted on a control board 300. The operating system ATM switch section 13a and the standby system ATM switch section 13b are separately mounted on an operating system ATM switch board 301a and a standby system ATM switch board 301b, respectively. The operating system call control section 14a and the standby system call control section 14b are separately mounted on an operating system call control board 302a and a standby system call control board 302b, respectively. By developing an ATM switch or an ATM subscriber line concentrator (the duplex call control unit) in such board combination, duplex composition of the ATM switch boards (301a and 301b) and duplex composition of the call control boards (302a and 302b ) are realized. By such board combination, the duplex composition of the ATM switch boards (301a and 301b) and the duplex composition of the call control boards (302a and 302b) can be maintained independently by the operations of the control section 10, the ATM switch section switch-over section 11, the call control section switch-over section 12 and the selectors 16a and 16b which have been explained referring to FIGS. 4A through 5D.

Figure 7:
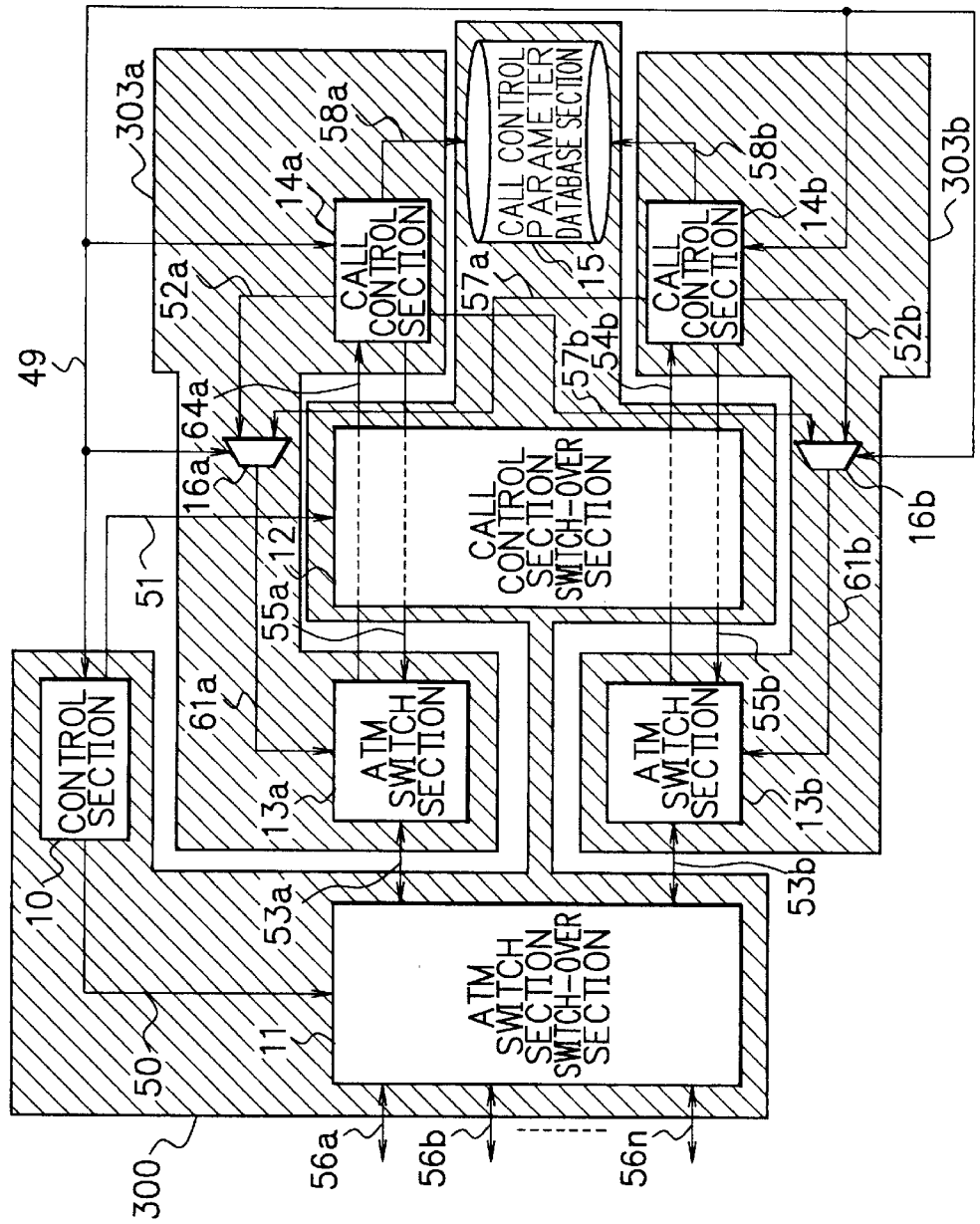
FIG. 7 is a block diagram showing a second example of implementation of the duplex call control unit according to the embodiment of the present invention.

FIG. 7 is a block diagram showing a second example of implementation of the duplex call control unit according to the embodiment of the present invention. Referring to FIG. 7, the control section 10, the ATM switch section switch-over section 11, the call control section switch-over section 12 and the call control parameter database section 15 are mounted on a control board 300. The operating system ATM switch section 13a and the operating system call control section 14a are mounted on an operating system ATM switch call control board 303a. The standby system ATM switch section 13b and the standby system call control section 14b are mounted on a standby system ATM switch call control board 303b. By developing an ATM switch or an ATM subscriber line concentrator (the duplex call control unit) in such board combination, duplex composition of the duplex call control unit is made similar to that of the conventional duplex call control unit of FIG. 1 from the viewpoint of hardware composition (board combination). However, the control board 300 is provided with the ATM switch section switch-over section 11 and the call control parameter database section 15, and thus the missing (loss) of ATM cells on the operating/standby switch-over is prevented and a call during establishment/release can be relieved from being interrupted. Therefore, duplex composition of higher reliability in comparison with the conventional duplex call control unit can be realized by the second example.

Figure 8:
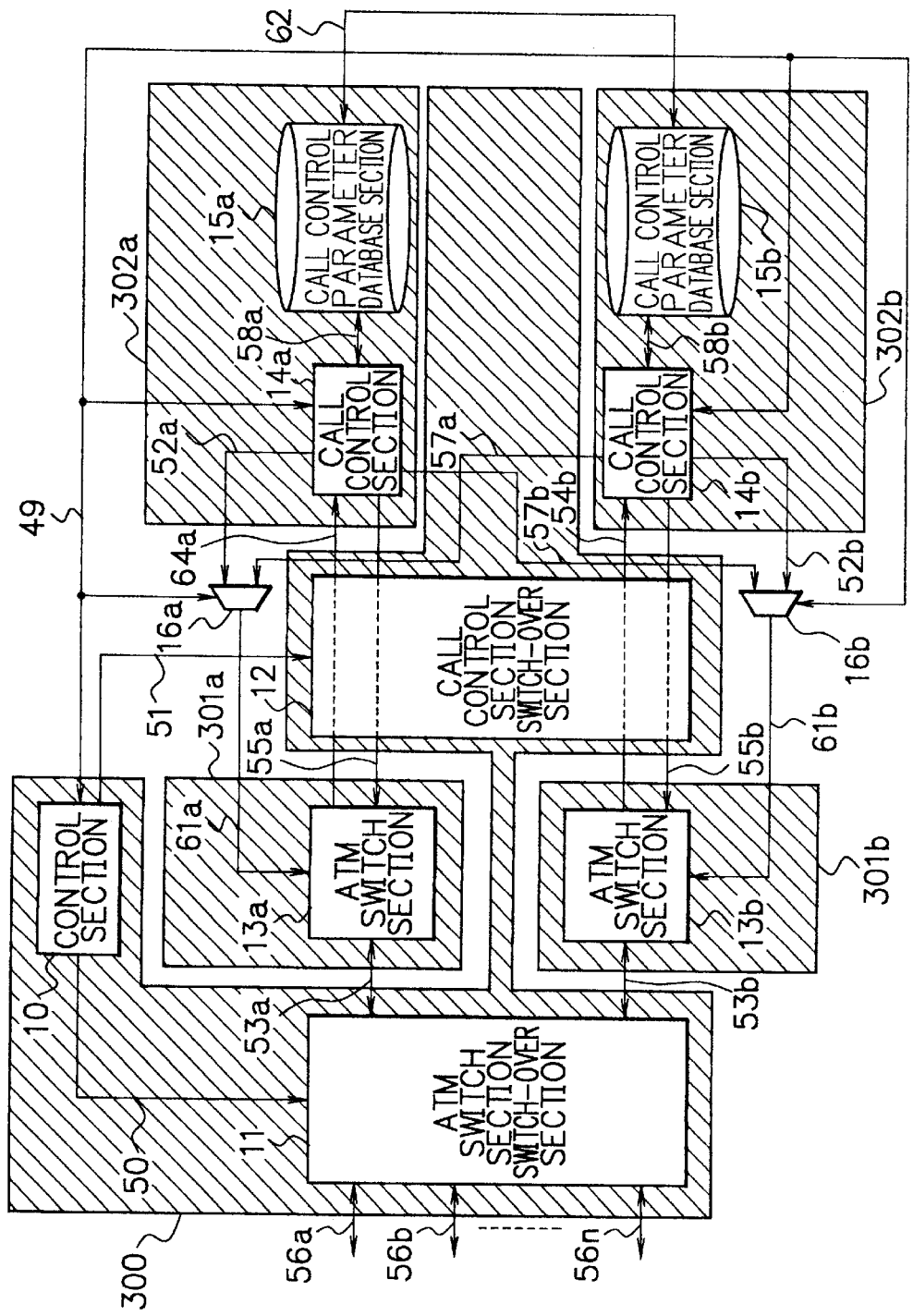
FIG. 8 is a block diagram showing a third example of implementation of the duplex call control unit according to the embodiment of the present invention.

FIG. 8 is a block diagram showing a third example of implementation of the duplex call control unit according to the embodiment of the present invention. Referring to FIG. 8, the control section 10, the ATM switch section switch-over section 11 and the call control section switch-over section 12 are mounted on a control board 300. The operating system ATM switch section 13a and the standby system ATM switch section 13b are separately mounted on an operating system ATM switch board 301a and a standby system ATM switch board 301b, respectively. The operating system call control section 14a and a call control parameter database section 15a for the operating system are mounted on an operating system call control board 302a. The standby system call control section 14b and a call control parameter database section 15b for the standby system are mounted on a standby system call control board 302b. The call control parameter database section 15a of the operating system call control board 302a and the call control parameter database section 15b of the standby system call control board 302b are connected together by a bus 62. The call control parameter database sections 15a and 15b are provided with functions for checking whether or not the call control parameters held by them are identical to each other. By developing an ATM switch or an ATM subscriber line concentrator (the duplex call control unit) in such board combination, in comparison with the first example of FIG. 6, loss of call control parameters can be prevented even when failure occurred to the control board 300. Even when abnormality occurred in call control parameters stored in one of the call control parameter database sections (15a or 15b), call control parameters stored in the other call control parameter database section (15b or 15a) can be used. Therefore, reliability of the duplex composition can be improved by the board combination of FIG. 8.

As described above, in the duplex call control unit according to the embodiment of the present invention, the control section 10 monitors the operating statuses of the two ATM switch sections 13a and 13b and the two call control sections 14a and 14b of the duplex call control unit, and outputs instructions concerning bus connection to the ATM switch section switch-over section 11, the call control section switch-over section 12 and the selectors 16a and 16b depending on the monitored operating statuses so that the operations of the ATM switch section can be executed at least by the first ATM switch section or the second ATM switch section that is working and so that the operations of the call control section can be executed at least by the first call control section or the second call control section that is working. In the call control parameter database section 15, call control parameters with respect to SVC connection information with regard to SVC connection which has already been established and call control parameters with respect to the statuses of call control protocols for SVC connection which is being established or being released are stored (updated by one of the call control section (14a or 14b) which is actually executing call control). The call control parameters stored in the call control parameter database section 15 are referred to by the other call control section that is operating as a standby system call control section or that is restarting working for adjusting its call control parameters.

Therefore, the operations of the ATM switch section and the call control section, that is, the extraction of call control cells for SVC connection from the ATM cells supplied via the ATM lines 56a, 56b, . . . , 56n, the reception of the call control cells, the outputting of call control cells as response, the setting of SVC connection information (as the result of the call control for a SVC connection) to a working ATM switch section, are executed by at least one ATM switch section (13a or 13b) that is working and one call control section (14a or 14b) that is working even if one of the ATM switch sections and/or one of the call control sections stopped working due to failure, maintenance, etc.

Therefore, loss of ATM cells for SVC connection on the switch-over from the operating system to the standby system is eliminated, and the disconnection of the SSCOP link connections on the switch-over from the operating system to the standby system is also eliminated. By the elimination of the SSCOP link disconnection, the SVC connection is saved from being released by another ATM switch or ATM subscriber terminal.

Signaling messages are communicated in the PDU (Protocol Data Unit) of the SSCOP layer. The disconnection of the SSCOP link connections on the switch-over from the operating system to the standby system is avoided as mentioned above. Therefore, loss of the signaling messages on the switch-over from the operating system to the standby system is also avoided. Consequently, duplicate control can be realized and executed for calls during call control, that is, for calls during establishment/release of SVC connection, as well as for calls whose SVC connection have already been established.

During call control, the call control parameters stored in the call control parameter database section 15 are updated by a call control section (14a or 14b) which is operating as the "operating system call control section", and are referred to by the other call control section (14b or 14a). When mismatch occurred in the call control parameters (with respect to the SVC connection information and the call control protocol statuses), the call control section (14b or 14a) which is referring to the call control parameter database section 15 forcibly sets its call control parameters as those of the call control parameter database section 15 (that is, as those of the "operating system call control section" (14a or 14b) which is updating the call control parameter database section 15). Therefore, the statuses of SVC connection setting to the ATM switch section (13a, 13b) and the statuses of the call control protocols in the SSCOP layer and the signaling layer can be made exactly the same between the two call control sections 14a and 14b of the operating system and the standby system.

The duplex ATM switch sections (13a and 13b) and the duplex call control sections (14a and 14b) are provided to the duplex call control unit as two independent duplex components, and the duplex composition of the call control sections 14a and 14b can be maintained even if one of the ATM switch sections 13a and 13b stopped working, and the duplex composition of the ATM switch sections 13a and 13b can be maintained even if one of the call control sections 14a and 14b stopped working. Therefore, a duplex call control unit of improved reliability can be provided.

Incidentally, as mentioned before, while the above explanation has been mainly given on the assumption that the functions of the ATM switch section 13a and the call control section 14a are fixed as the "operating system ATM switch section 13a" and the "operating system call control section 14a" and the functions of the ATM switch section 13b and the call control section 14b are fixed as the "standby system ATM switch section 13b" and the "standby system call control section 14b", the aforementioned "operating/standby relative operation" can also be employed. In such cases, the control section 10 grasps which of the ATM switch sections (13a or 13b) is operating as the "operating system ATM switch section" now and which of the call control sections (14a or 14b) is operating as the "operating system call control section" now, and outputs instructions to the ATM switch section switch-over section 11, the call control section switch-over section 12 and the selectors 16a and 16b to execute proper bus connection similarly to the explanation which has been given referring to FIGS. 3A through 5D.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A duplex call control unit comprising:
a first ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;
a second ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;
a first call control section which receives call control cells which has been extracted by the first ATM switch section or the second ATM switch section, outputs call control cells as response to the first ATM switch section or the second ATM switch section, and when call control for an SVC connection is completed, sets SVC connection information to the first ATM switch section or the second ATM switch section;
a second call control section which receives call control cells which has been extracted by the first ATM switch section or the second ATM switch section, outputs the call control cells as response to the first ATM switch section or the second ATM switch section, and when call control for an SVC connection is completed, sets SVC connection information to the first ATM switch section or the second ATM switch section;
a call control parameter database section for storing call control parameters with respect to SVC connection information with regard to SVC connection which has already been established and call control parameters with respect to the statuses of call control protocols for SVC connection which is being established or being released, to be referred to by the first call control section or the second call control section that is operating as a standby system call control section or that is restarting working for adjusting its call control parameters;
a control section which monitors operating statuses of the first ATM switch section, the second ATM switch section, the first call control section and the second call control section, and outputs instructions concerning bus connection depending on the monitored operating statuses;
a first switch-over section for switching bus connection between the ATM lines and the ATM switch sections according to the instructions supplied from the control section so that the operations of the ATM switch section can be executed at least by the first ATM switch section or the second ATM switch section that is working; and
a second switch-over section for switching bus connection between the ATM switch sections and the call control sections according to the instructions supplied from the control section so that the operations of the call control section can be executed at least by the first call control section or the second call control section that is working.

2. A duplex call control unit as claimed in claim 1, wherein the call control parameters with respect to SVC connection information include "VPI (Virtual Path Identifier)", "VCI (Virtual Channel Identifier)", "traffic information", "band width", and "call reference".

3. A duplex call control unit as claimed in claim 2, wherein the call control parameter "traffic information" includes "priority" and "QoS (Quality of Service)".

4. A duplex call control unit as claimed in claim 1, wherein the call control parameters with respect to call control protocol statuses include call control parameters for the SSCOP layer, SSCF layer and call control parameters for the signaling layer.

5. A duplex call control unit as claimed in claim 4, wherein the call control parameters for the SSCOP layer include "SSCOP state variables", "SSCOP timer value", "SSCOP parameters", "maximum SSCOP SDU size", and "maximum SSCOP UU size(j)" for each SSCOP link connections.

6. A duplex call control unit as claimed in claim 4, wherein the call control parameters for the SSCF layer include "SSCF state variables" for each SSCOP link connections.

7. A duplex call control unit as claimed in claim 4, wherein the call control parameters for the signaling layer include "call reference" and "status for call reference" for each calls.

8. A duplex call control unit as claimed in claim 1, wherein:

in the case where the control section detected that all of the four monitored components are working, the control section instructs the first switch-over section to execute bus connection for transferring the ATM cells supplied via the ATM lines to both the first ATM switch section and the second ATM switch section and transmitting ATM cells supplied from the first ATM switch section to the ATM lines, and instructs the second switch-over section to execute bus connection for transferring the call control cells extracted by the first ATM switch section to both the first call control section and the second call control section, transferring the call control cells as response outputted by the first call control section to the first ATM switch section, transferring SVC connection information outputted by the first call control section as the result of the call control to the first ATM switch section, and transferring SVC connection information outputted by the second call control section as the result of the call control to the second ATM switch section, and in the case where the control section detected that the first call control section out of the four monitored components is not working, the control section instructs the first switch-over section to execute bus connection for transferring the ATM cells supplied via the ATM lines to both the first ATM switch section and the second ATM switch section and transmitting ATM cells supplied from the first ATM switch section to the ATM lines, and instructs the second switch-over section to execute bus connection for transferring the call control cells extracted by the first ATM switch section to the second call control section, transferring the call control cells as response outputted by the second call control section to the first ATM switch section, and transferring SVC connection information outputted by the second call control section as the result of the call control to both the first ATM switch section and the second ATM switch section, and in the case where the control section detected that the first ATM switch section out of the four monitored components is not working, the control section instructs the first switch-over section to execute bus connection for transferring the ATM cells supplied via the ATM lines to the second ATM switch section and transmitting ATM cells supplied from the second ATM switch section to the ATM lines, and instructs the second switch-over section to execute bus connection for transferring the call control cells extracted by the second ATM switch section to both the first call control section and the second call control section, transferring the call control cells as response outputted by the second call control section to the second ATM switch section, and transferring SVC connection information outputted by the second call control section as the result of the call control to the second ATM switch section, and in the case where the control section detected that the first call control section and the first ATM switch section out of the four monitored components are not working, the control section instructs the first switch-over section to execute bus connection for transferring the ATM cells supplied via the ATM lines to the second ATM switch section and transmitting ATM cells supplied from the second ATM switch section to the ATM lines, and instructs the second switch-over section to execute bus connection for transferring the call control cells extracted by the second ATM switch section to the second call control section, transferring the call control cells as response outputted by the second call control section to the second ATM switch section, and transferring SVC connection information outputted by the second call control section as the result of the call control to the second ATM switch section.

9. A duplex call control method for controlling a duplex call control unit which is provided with:

a first ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;

a second ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;

a first call control section which receives call control cells which has been extracted by the first ATM switch section or the second ATM switch section, outputs call control cells as response to the first ATM switch section or the second ATM switch section, and when call control for an SVC connection is completed, sets SVC connection information to the first ATM switch section or the second ATM switch section; and a second call control section which receives call control cells which has been extracted by the first ATM switch section or the second ATM switch section, outputs the call control cells as response to the first ATM switch section or the second ATM switch section, and when call control for an SVC connection is completed, sets SVC connection information to the first ATM switch section or the second ATM switch section, comprising the steps of:

a call control parameter storage step in which call control parameters with respect to SVC connection information with regard to SVC connection which has already been established and call control parameters with respect to the statuses of call control protocols for SVC connection which is being established or being released are stored in a call control parameter database section to be referred to by the first call control section or the second call control section for adjusting its call control parameters;

a call control parameter reference step in which the call control parameters stored in the call control parameter database section is referred to by the first call control section or the second call control section that is operating as a standby system call control section or that is restarting working, and thereby call control parameters of the call control section is adjusted; and a bus connection control step in which operating statuses of the first ATM switch section, the second ATM switch section, the first call control section and the second call control section are monitored, and instructions concerning bus connection are generated and outputted depending on the monitored operating statuses so as to control bus connection of a first switch-over section which is provided between the ATM lines and the ATM switch sections and bus connection of a second switch-over section which is provided between the ATM switch sections and the call control sections so that the operations of the ATM switch section can be executed at least by the first ATM switch section or the second ATM switch section that is working and so that the operations of the call control section can be executed at least by the first call control section or the second call control section that is working.

10. A duplex call control method as claimed in claim 9, wherein the call control parameters with respect to SVC connection information include "VPI (Virtual Path Identifier)", "VCI (Virtual Channel Identifier)", "traffic information", "band width", and "call reference".

11. A duplex call control method as claimed in claim 10, wherein the call control parameter "traffic information" includes "priority" and "QoS (Quality of Service)".

12. A duplex call control method as claimed in claim 9, wherein the call control parameters with respect to call control protocol statuses include call control parameters for the SSCOP layer and call control parameters for the signaling layer.

13. A duplex call control method as claimed in claim 12, wherein the call control parameters for the SSCOP layer include "SSCOP state variables", "SSCOP timer value", "SSCOP parameters", "maximum SSCOP SDU size", and "maximum SSCOP UU sizes)" for each SSCOP link connections.

14. A duplex call control method as claimed in claim 12, wherein the call control parameters for the SSCF layer include "SSCF state variables" for each SSCOP link connections.

15. A duplex call control method as claimed in claim 12, wherein the call control parameters for the signaling layer include "call reference" and "status for call reference" for each calls.

16. A duplex call control method as claimed in claim 9, wherein in the bus connection control step:
  in the case where all of the four monitored components are detected to be working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to both the first call control section and the second call control section, transferring the call control cells as response outputted by the first call control section to the first ATM switch section, transferring SVC connection information outputted by the first call control section as the result of the call control to the first ATM switch section, and transferring SVC connection information outputted by the second call control section as the result of the call control to the second ATM switch section, and
  in the case where the first call control section out of the four monitored components is detected to be not working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to the second call control section, transferring the call control cells as response outputted by the second call control section to the first ATM switch section, and transferring SVC connection information outputted by the second call control section as the result of the call control to both the first ATM switch section and the second ATM switch section, and
  in the case where the first ATM switch section out of the four monitored components is detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to both the first call control section and the second call control section, transferring the call control cells as response outputted by the second call control section to the second ATM switch section, and transferring SVC connection information outputted by the second call control section as the result of the call control to the second ATM switch section, and
  in the case where the first call control section and the first ATM switch section out of the four monitored components are detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to the second call control section, transferring the call control cells as response outputted by the second call control section to the second ATM switch section, and transferring SVC connection information outputted by the second call control section as the result of the call control to the second ATM switch section.

17. A machine-readable record medium storing a program for instructing a microprocessor unit etc. to execute a duplex call control process for controlling a duplex call control unit which is provided with:
  a first ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;
  a second ATM switch section for switching ATM cells, which extracts call control cells for establishment/release of SVC connection from ATM cells which are supplied via ATM lines, and when call control cells as response are supplied thereto, inserts the call control cells in proper ATM cells and outputs the ATM cells including the call control cells so as to be transmitted to proper ATM lines;
  a first call control section which receives call control cells which has been extracted by the first ATM switch section or the second ATM switch section, outputs call control cells as response to the first ATM switch section or the second ATM switch section, and when call control for an SVC connection is completed, sets SVC connection information to the first ATM switch section or the second ATM switch section; and
  a second call control section which receives call control cells which has been extracted by the first ATM switch section or the second ATM switch section, outputs the call control cells as response to the first ATM switch section or the second ATM switch section, and when call control for an SVC connection is completed, sets SVC connection information to the first ATM switch section or the second ATM switch section, wherein the duplex call control process comprises the steps of:

a call control parameter storage step in which call control parameters with respect to SVC connection information with regard to SVC connection which has already been established and call control parameters with respect to the statuses of call control protocols for SVC connection which is being established or being released are stored in a call control parameter database section to be referred to by the first call control section or the second call control section for adjusting its call control parameters;

a call control parameter reference step in which the call control parameters stored in the call control parameter database section is referred to by the first call control section or the second call control section that is operating as a standby system call control section or that is restarting working, and thereby call control parameters of the call control section is adjusted; and a bus connection control step in which operating statuses of the first ATM switch section, the second ATM switch section, the first call control section and the second call control section are monitored, and instructions concerning bus connection are generated and outputted depending on the monitored operating statuses so as to control bus connection of a first switch-over section which is provided between the ATM lines and the ATM switch sections and bus connection of a second switch-over section which is provided between the ATM switch sections and the call control sections so that the operations of the ATM switch section can be executed at least by the first ATM switch section or the second ATM switch section that is working and so that the operations of the call control section can be executed at least by the first call control section or the second call control section that is working.

18. A machine-readable record medium as claimed in claim 17, wherein the call control parameters with respect to SVC connection information include "VPI (Virtual Path Identifier)", "VCI (Virtual Channel Identifier)", "traffic information", "band width", and "call reference".

19. A machine-readable record medium as claimed in claim 17, wherein the call control parameters with respect to call control protocol statuses include call control parameters for the SSCOP layer, SSCF layer and call control parameters for the signaling layer.

20. A machine-readable record medium as claimed in claim 19, wherein the call control parameters for the SSCOP layer include "SSCOP state variables", "SSCOP timer value", "SSCOP parameters", "maximum SSCOP SDU size", and "maximum SSCOP UU sizes)" for each SSCOP link connections.

21. A machine-readable record medium as claimed in claim 19, wherein the call control parameters for the SSCF layer include "SSCF state variables" for each SSCOP link connections.

22. A machine-readable record medium as claimed in claim 19, wherein the call control parameters for the signaling layer include "call reference" and "status for call reference" for each calls.

23. A machine-readable record medium as claimed in claim 17, wherein in the bus connection control step:

in the case where all of the four monitored components are detected to be working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to both the first call control section and the second call control section, transferring the call control cells as response outputted by the first call control section to the first ATM switch section, transferring SVC connection information outputted by the first call control section as the result of the call control to the first ATM switch section, and transferring SVC connection information outputted by the second call control section as the result of the call control to the second ATM switch section, and in the case where the first call control section out of the four monitored components is detected to be not working, the first switch-over section is instructed to execute bus connection for transferring the ATM cells supplied via the ATM lines to both the first ATM switch section and the second ATM switch section and transmitting ATM cells supplied from the first ATM switch section to the ATM lines, and the second switch-over section is instructed to execute bus connection for transferring the call control cells extracted by the first ATM switch section to the second call control section, transferring the call control cells as response outputted by the second call control section to the first ATM switch section, and transferring SVC connection information outputted by the second call control section as the result of the call control to both the first ATM switch section and the second ATM switch section, and in the case where the first ATM switch section out of the four monitored components is detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to both the first call control section and the second call control section, transferring the call control cells as response outputted by the second call control section to the second ATM switch section, and transferring SVC connection information outputted by the second call control section as the result of the call control to the second ATM switch section, and in the case where the first call control section and the first ATM switch section out of the four monitored components are detected to be not working, the first switch-over section is instructed to execute bus connection for transferring the ATM cells supplied via the ATM lines to the second ATM switch section and transmitting ATM cells supplied from the second ATM switch section to the ATM lines, and the second switch-over section is instructed to execute bus connection for transferring the call control cells extracted by the second ATM switch section to the second call control section, transferring the call control cells as response outputted by the second call control section to the second ATM switch section, and transferring SVC connection information outputted by the second call control section as the result of the call control to the second ATM switch section.

* * * * *